US009167931B1

(12) United States Patent
Montgomery

(10) Patent No.: US 9,167,931 B1

(45) Date of Patent: Oct. 27, 2015

(54) UTENSIL HOLDER

(71) Applicant: Seana L. Montgomery, McKinney, TX (US)

(72) Inventor: Seana L. Montgomery, McKinney, TX (US)

( * ) Notice: Subject to any disclaimer, the term of this patent is extended or adjusted under 35 U.S.C. 154(b) by 69 days.

(21) Appl. No.: 13/843,416

(22) Filed: Mar. 15, 2013

(51) Int. Cl.
*A47J 27/00* (2006.01)

(52) U.S. Cl.
CPC .................................... *A47J 27/002* (2013.01)

(58) Field of Classification Search
CPC ............................... B44D 3/123; A47J 27/002
USPC ............. 220/573.1, 735, 736, 756, 757, 762, 220/763, 764
See application file for complete search history.

(56) References Cited

U.S. PATENT DOCUMENTS 269,054 A * 12/1882 Hemsteger .................... 220/574
2,032,221 A * 2/1936 Myers ........................... 220/814
2,232,738 A * 2/1941 Serr .............................. 220/751
2,315,269 A * 3/1943 Morgillo ....................... 248/110
2,427,004 A * 9/1947 Kampf .......................... 220/763
2,444,447 A * 7/1948 Josselyn ....................... 220/763
2,493,751 A * 1/1950 Davis ............................. 294/33
2,519,666 A * 8/1950 Knox ............................ 220/736
2,605,945 A * 8/1952 Dechar ......................... 294/146
2,713,469 A * 7/1955 Wright ..................... 248/229.26
2,855,123 A * 10/1958 Kintz ............................ 220/736
2,881,945 A * 4/1959 Rappaport .................... 248/688
3,981,044 A * 9/1976 Luebke et al. ................ 220/759
4,196,821 A * 4/1980 Teti et al. ...................... 220/756
4,757,568 A * 7/1988 Jones .............................. 15/105
4,919,298 A * 4/1990 Gregory ........................ 220/736
4,995,526 A * 2/1991 Garrison ....................... 220/735
5,105,963 A * 4/1992 Scott ............................ 220/735
5,518,211 A * 5/1996 Gaskill et al. ................ 248/37.6
5,660,300 A * 8/1997 Demetrio ...................... 220/763
5,678,790 A * 10/1997 Dwyer ......................... 248/37.6
5,727,712 A * 3/1998 Costello ........................ 220/703
5,788,113 A * 8/1998 Yeh .............................. 220/756
5,806,818 A * 9/1998 Heywood .................. 248/213.2
5,823,385 A * 10/1998 Cautereels .................... 220/762
5,924,592 A * 7/1999 Hieronymus ............. 220/574.1
6,032,822 A * 3/2000 Munari ...................... 220/573.1
6,102,458 A * 8/2000 Scace .............................. 294/34
6,419,194 B1 * 7/2002 LoSacco et al. .............. 248/113
6,485,691 B1 * 11/2002 Jones ........................... 422/557
6,654,986 B2 * 12/2003 Wang ............................. 16/422
7,090,094 B2 * 8/2006 Wade et al. ................... 220/764
7,611,146 B2 * 11/2009 Arden ........................... 273/317
8,113,378 B2 * 2/2012 Wassmann .................... 220/703
8,695,838 B1 * 4/2014 Montgomery ............. 220/574.1
8,746,497 B2 * 6/2014 Bourbeau et al. ............. 220/756
2007/0210094 A1 * 9/2007 Kutsch et al. ................. 220/735
2007/0289981 A1 * 12/2007 Shaw ............................ 220/735
2009/0294454 A1 * 12/2009 Harding ..................... 220/574.1
2013/0037553 A1 * 2/2013 Bourbeau et al. .......... 220/573.1

* cited by examiner

*Primary Examiner* — Fenn Mathew
*Assistant Examiner* — Christopher McKinley
(74) *Attorney, Agent, or Firm* — Patent Capital Group

(57) ABSTRACT

An apparatus includes a pot with a sleeve attached to an outside portion of the pot, and a utensil holder coupled to the pot. The utensil holder includes an arm disposed through the sleeve and a handle pivotally attached to the arm, such that the handle can be rotated relative to the arm to position a portion of the handle inside the pot. The utensil holder can be configured at least in a first configuration and a second configuration. In the first configuration, the handle is positioned outside the pot to enable the handle to be used as a grip for the pot, and in the second configuration, the portion of the handle is positioned inside the pot to enable the handle to support an object over the pot. In some embodiments, the handle may be attached to the arm with a hinge.

16 Claims, 16 Drawing Sheets

60 12 50 68 54 56 52 68 62 64 66 10

54 74 62 76 70 68 52 10

UTENSIL HOLDER

TECHNICAL FIELD

This disclosure relates in general to household utensils and, more particularly, to a utensil holder.

BACKGROUND

When cooking, it is customary to use utensils (e.g., spoons, ladles, spatulas, thongs, strainers, scoops, etc.) for occasional manipulation (e.g., stirring) of liquids and other food in a pot. When the utensil is not in use, it is laid on a utensil-rest on the counter, or on the counter itself. In either case, drippings from the utensil may require that the counter or utensil-rest be washed, in addition to the utensil and pot. To reduce the washing, if the utensil handle is long enough, it may be leaned against the inside wall of the pot; however the utensil can become uncomfortably hot to handle. Moreover, the utensil may fall into the pot if the handle is not long enough.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

In an example embodiment, an apparatus includes a pot with a sleeve attached to an outside portion of the pot, and a utensil holder coupled to the pot. The utensil holder includes an arm disposed through the sleeve, and a handle pivotally attached to the arm, such that the handle can be rotated relative to the arm to position a portion of the handle inside the pot. In various embodiments, the utensil holder can be positioned in at least a first configuration and a second configuration. In the first configuration, the handle is positioned outside the pot to enable the handle to be used as a grip for the pot, and in the second configuration, the portion of the handle is positioned inside the pot to enable the handle to support an object over the pot. In more specific embodiments, the handle can be locked to the arm such that there is substantially no relative rotation between the handle and the arm.

In other embodiments, the handle is attached to the arm with a hinge. In some embodiments, the handle may have a recess configured to support an object. In various embodiments, the arm may include stoppers that prevent uncoupling the utensil holder from the sleeve. In some embodiments, the arm may be slidable through the sleeve and can be locked into the sleeve with a locking mechanism.

In other embodiments, the utensil holder includes an arm and a handle attached to the arm. The arm is locked to the sleeve, and the handle is usable as a grip for the pot in a first configuration. In a second configuration, the arm is slidable through the sleeve to an angular position relative to the pot and the handle can support the arm, which can support an object. In specific embodiments, the arm may include a recess to support the object. In other embodiments, the arm may include stoppers to prevent disengaging the utensil holder from the sleeve, and other features.

Example Embodiments

Figure 1:
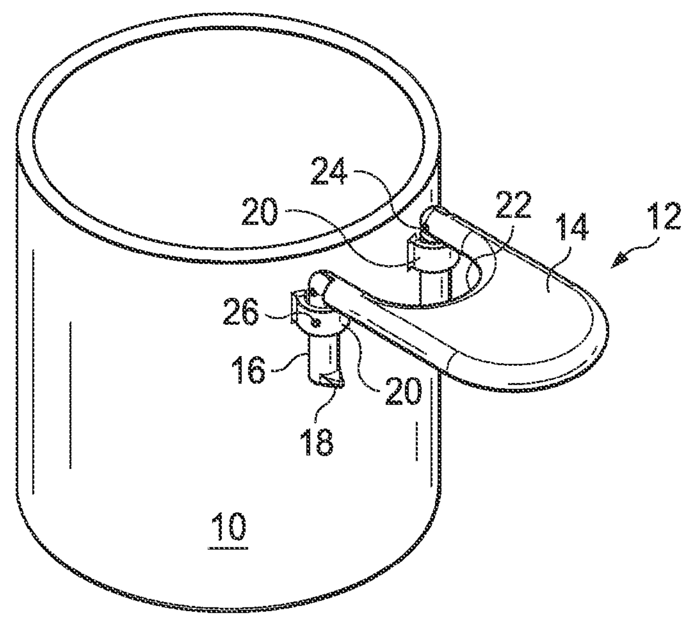
FIG. 1 is a simplified perspective view illustrating an example configuration of an embodiment of a utensil holder according to an example embodiment.

FIG. 1 is a simplified perspective view illustrating an example configuration of an embodiment of a utensil holder. A pot 10 has a utensil holder 12 coupled thereto. Utensil holder 12 comprises a handle 14 pivotally attached to one or more arms 16. Handle 14 may be of sufficient width and length to support a spoon or other object (e.g., spatula, stirrer, etc.). In the embodiment illustrated in FIG. 1, two arms 16 are shown. In other embodiments, handle 14 may be attached to a single arm 16, or multiple arms (3 or more). Additionally, various types of rotation can occur in various directions (e.g., in a circular fashion in which handle 14 can move in a horizontal plane where it is sometimes hovering over pot 10 and, in another rotational aspect, away from pot 10, or tucked to the side of pot 10, where it is out of the way of subsequent cooking activities, or the rotation can occur an over-the-top rotation in which the utensil holder moves in a vertical plane). Arm 16 may include a stopper 18 that prevents uncoupling of utensil holder 12 from pot 10. Stopper 18 may be attached to arm 16 using any suitable method (e.g., welding, fastening with screws, etc.); alternatively, stopper 18 may be formed as an integral part of arm 16.

Note that, as an option, one or more magnetic materials can be used in the construction of utensil holder 12, arms 16, and/or handle 14. In other examples, one or more rare earth magnets may be used to facilitate any type of coupling between these components and/or to a given utensil. In certain cases, such magnetic materials may also be used in the context of locking utensil holder 12 into one or more positions, as is further detailed below. Hence, magnetic materials of any kind can be used in the construction of the elements of FIG. 1.

Utensil holder 12 may be coupled to pot 10 through sleeve 20. For example, arm 16 may be disposed through sleeve 20. In some embodiments, arm 16 may be configured to slide within sleeve 20. In other embodiments, arm 16 may be attached immovably to sleeve 20 (e.g., welded, brazed, shrink fit, force fit, etc.). Sleeve 20 may be attached to an outside portion of pot 10 using any suitable method, including welding, brazing, riveting, gluing, and fastening with a screw (or multiple screws). In the embodiment illustrated in FIG. 1, each arm 16 is shown disposed through separate sleeves 20.

In some embodiments, handle 14 may include a curved surface 22, for example, to provide an ergonomic shape for ease of manually lifting pot 10. In various embodiments, handle 14 may be pivotally attached to arms 16 with a hinge 24. Hinge 24 may be of any suitable construction, including barrel hinge, mortise hinge, etc. that can permit handle 14 to pivot relative to arm 16. In some embodiments, hinge 24 may be configured to lock handle 14 into a position in one configuration (e.g., when handle 14 is perpendicular to arm 16) and to unlock in other configurations (e.g., when handle 14 is at an acute or obtuse angle relative to arm 16). For example, hinge 24 may include a groove and pin. In an unlocked configuration, the pin may be located at a rotational axis, to enable handle 14 to pivot around the pin. In the locked configuration, the pin may be moved (e.g., pushed) into the groove, away from its rotational axis, so that handle 14 cannot rotate relative to arm 16. Various other example designs for locking and unlocking of hinge 24 may be used within the broad scope of the present disclosure.

According to embodiments of the present disclosure, utensil holder 12 may be positioned in multiple configurations, for example, as a grip for pot 10 in one configuration and as a support for a spoon (or other object) in another configuration. In a first configuration, handle 14 may be positioned outside pot 10 and may be usable as a grip to move pot 10. In such a configuration, utensil holder 12 may be locked into position and may not move relative to pot 10. For example, hinge 24 may be set to a locked position such that handle 14 may not rotate relative to arm 16. Utensil holder 12 may be locked into sleeve 26 using a locking mechanism 26 such that utensil holder 12 may not slide. Locking mechanism 26 may be of any suitable type, such that it may be easily locked and unlocked as needed.

In one embodiment, locking mechanism 26 may include a button-and-hole, comprising a spring-loaded button, or knob, or similar protruding element, on arm 16 that can be inserted (e.g., snap) into a corresponding hole in sleeve 20. In the locked position, the spring-loaded button may be inserted into the corresponding hole, thereby protrude out of the hole, locking arm 16 into an immovable position relative to sleeve 20. When the spring-loaded button is disengaged from the corresponding hole, arm 16 may be slidable through sleeve 20.

Figure 2:
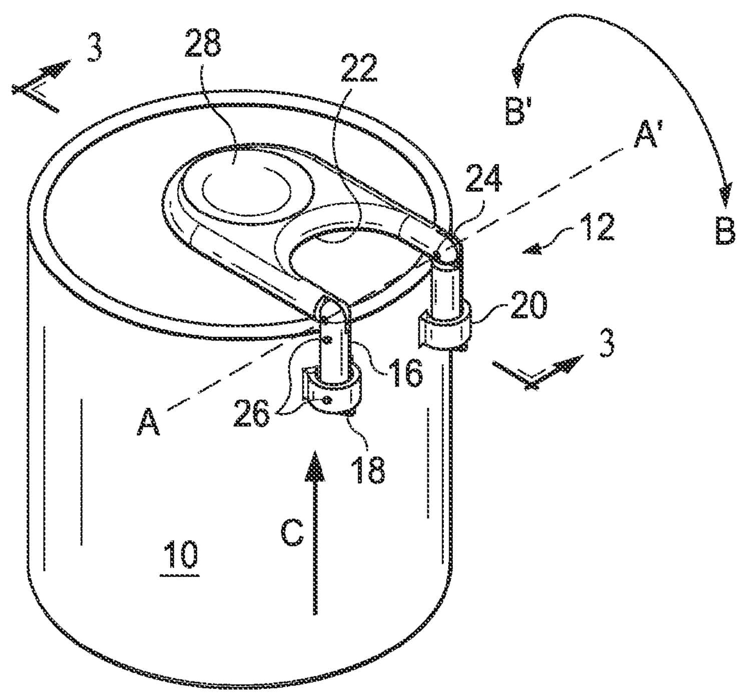
FIG. 2 is a simplified view illustrating another example configuration of the embodiment of the utensil holder.

Turning to FIG. 2, FIG. 2 is a simplified perspective view of another configuration of the embodiment of utensil holder 12. In the configuration illustrated in FIG. 2, handle 14 may be rotated relative to arm 16, along axis A-A', in directions shown by arrows B-B1'. Upon rotation (e.g., from B to B'), a portion of handle 14 may be positioned inside pot 10 to enable handle 14 to support a spoon or other object over pot 10. In various embodiments, utensil holder 12 may be unlocked from its locked position to enable it to be used in the illustrated configuration of FIG. 2. In some embodiments, locking mechanism 26 may be unlocked, for example, by pushing the spring-loaded button of locking mechanism 26 inwards and sliding arm 16 within sleeve 20 to disengage the spring-loaded button from the corresponding hole in sleeve 20. In the unlocked position, utensil holder 12 may be pulled upward (e.g., in a direction indicated by arrow C) toward a rim of pot 10. In some embodiments, arm 16 may be pulled until stopper 18 touches sleeve 20. In some embodiments, wherein handle 14 is locked to arm 16, handle 14 may be first unlocked by pulling it outward (or inward) first and then upward, to release hinge 24. Upon unlocking, handle 14 may be rotated towards an inside of pot 10 and dropped into a substantially horizontal position such than utensil holder 12 can support a spoon or other object. Utensil holder 12 may include a recess 28 in handle 14. In one embodiment, recess 28 may be a depressed semi-spherical surface, configured to receive a curved spoon or similar object. When utensil holder 12 is positioned with recess 28 disposed inside pot 10, a concave surface of recess 28 may face upwards to stably support any object placed thereon.

To return utensil holder 12 to the configuration wherein utensil holder 12 is usable as a grip, handle 14 may be pivoted back (in a direction from B' to B), around axis A-A', into its locked position, and utensil holder 12 may be pushed downward, until locking mechanism 26 locks utensil holder 12 into sleeve 20. For example, in a button-and-hole type locking mechanism 26, the spring-loaded button may be pushed inwards as arm 16 moves down through sleeve 20, and when the spring-loaded button reaches the corresponding hole in sleeve 20, the spring-loaded button can snap into the corresponding hole (e.g., by spring action) to lock utensil holder 12 into place.

Figure 3B:
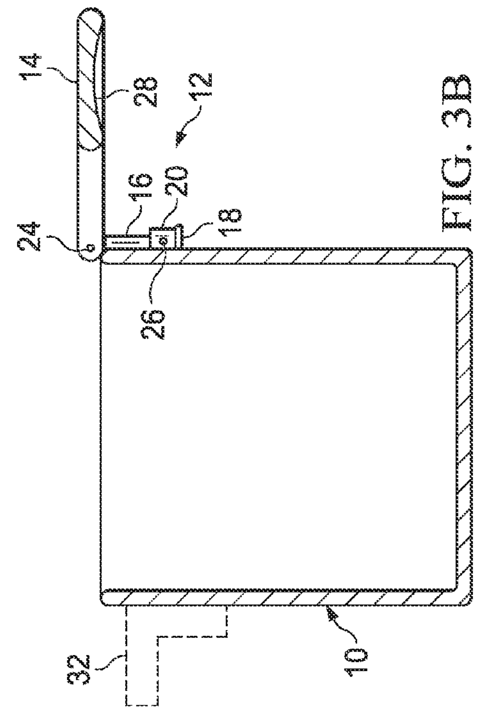
FIGS. 3A, 3B and 3C are cross-sectional views of an embodiment of the utensil holder.
Figure 3C:
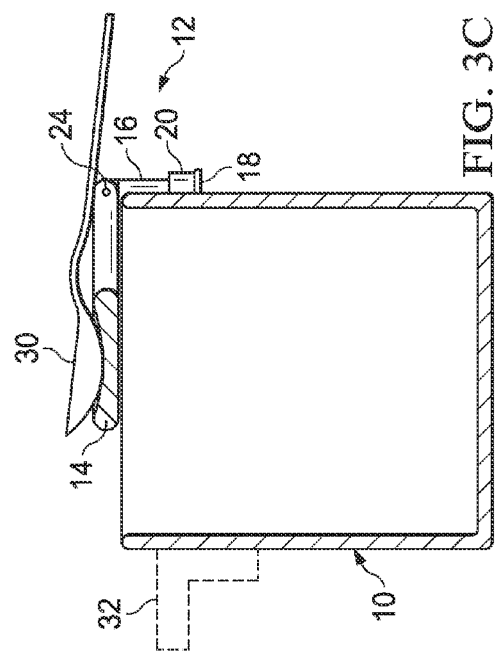
Figure 3A:
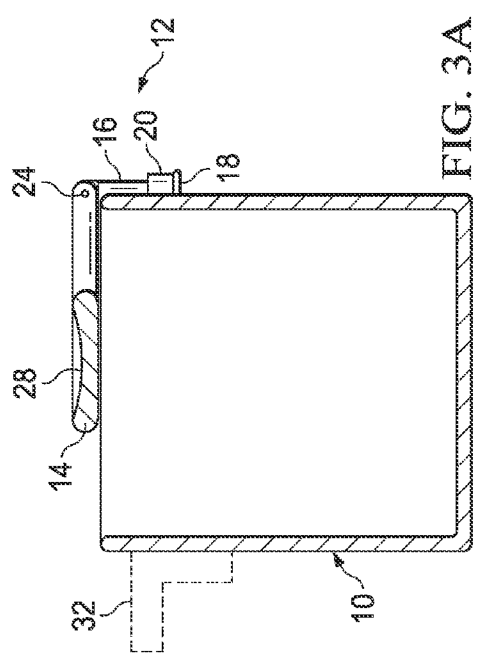

Turning to FIGS. 3A, 3B, and 3C, FIGS. 3A, 3B, and 3C are simplified cross-sectional views of an embodiment of utensil holder 12, the cross-sections being taken across line 3-3' of FIG. 2. An optional handle 32 may be provided on pot 10 opposite to utensil holder 12, for example, to move pot 10 as desired.

FIG. 3A shows a simplified cross-sectional view of a configuration of utensil holder 12, wherein utensil holder 12 can be used as a support for the spoon (or other object) over pot 10. Handle 14 may be pivoted with hinge 24 around arm 16 towards the inside of pot 10, and handle 14 may be dropped into a substantially horizontal position. The concave surface of recess 28 may face outwards in such configuration. Arm 16 may be configured such that as arm 16 is slid through sleeve 20, and stopper 18, which is disposed along an end of arm 16, touches sleeve 20, handle 14 is sufficiently above the rim of pot 10, and is pivotable around hinge 24 to be dropped over the rim. FIG. 3B shows a simplified cross-sectional view of a configuration of utensil holder 12, wherein utensil holder 12 can be used as a grip for pot 10. In such configuration, optional handle 32 may be used together with utensil holder 12 so that pot 10 may be lifted or moved conveniently. Handle 14 may face away from the center of pot 10, similar to any suitable conventional pot handle.

FIG. 3C shows a simplified cross-sectional view of a configuration of utensil holder 12, with a spoon 30 resting on recess 28. During an example operation, a user can lock utensil holder 12 in a first configuration (e.g., as a grip for pot 10), and move pot 10 as needed. The user can unlock utensil holder 12 into a second configuration (e.g., as a support for a spoon), such that a portion of handle 14 is positioned substantially horizontally inside pot 10. The user can place a spoon (or other object) on the portion of handle 14 positioned inside pot 10. Any drippings from the spoon can fall back into pot 10. After use, utensil holder 12 may be positioned back into the first configuration, and pot 10 moved as desired.

Figure 4:
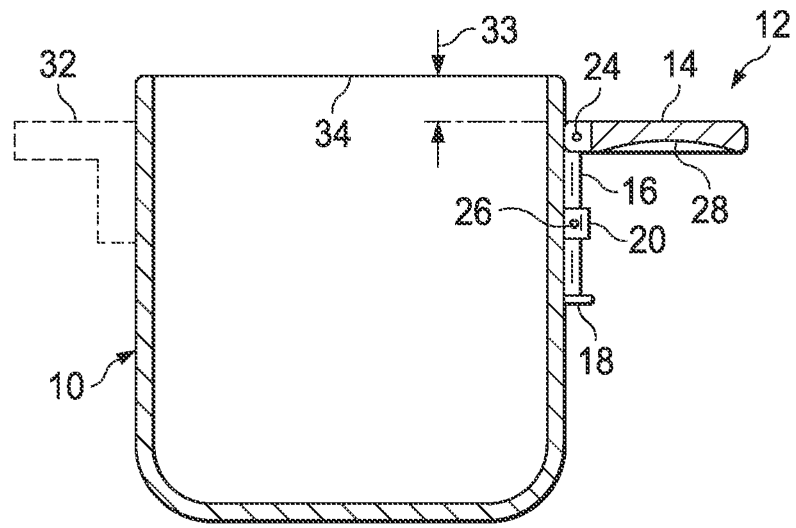
FIG. 4 is a cross-sectional view of another embodiment of the utensil holder.

Turning to FIG. 4, FIG. 4 is a simplified cross-sectional view of another embodiment of utensil holder 12. Utensil holder 12 (and optional handle 32) may be positioned at a depth 33 below a rim 34 of pot 10. Arm 16 of utensil holder 12 may be suitably configured to be of sufficient length such that handle 14 may be pulled upwards, and rotated around hinge 24 to be dropped into a substantially horizontal position over rim 34. For example, the length arm 16 should be larger than depth 33 to enable utensil holder 12 to be pulled up and handle 14 rotated over rim 34 of pot 10. In one example implementation, the configuration of utensil holder 12 allows two handles to be effectively provided in a substantially parallel fashion, which can stabilize pot 10 for movement (e.g., for the transport of pot 10 during cooking opportunities).

Figure 5:
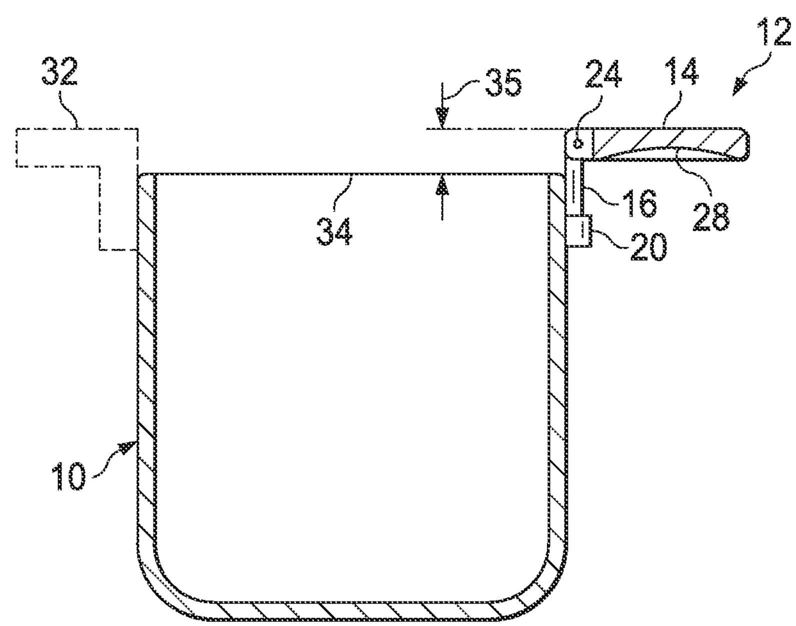
FIG. 5 is a cross-sectional view of yet another embodiment of the utensil holder.

Turning to FIG. 5, FIG. 5 is a simplified cross-sectional view of yet another embodiment of utensil holder 12. Utensil holder 12 (and optional handle 32) may be positioned at a height 35 above a rim 34 of pot 10. Arm 16 may be attached to sleeve 20, such that arm 16 may not slide through sleeve 20. In some embodiments, stopper 18 may not be attached to arm 16, as arm 16 cannot slide through sleeve 20. To change the configuration of utensil holder 12 to one wherein it supports the spoon, handle 14 may be rotated around hinge 24 and dropped into a substantially horizontal position over rim 34. In one example implementation, the configuration of utensil holder 12 allows two handles to be effectively provided in a substantially parallel fashion, which can stabilize pot 10 for movement (e.g., for the transport of pot 10 during cooking opportunities).

Figure 6:
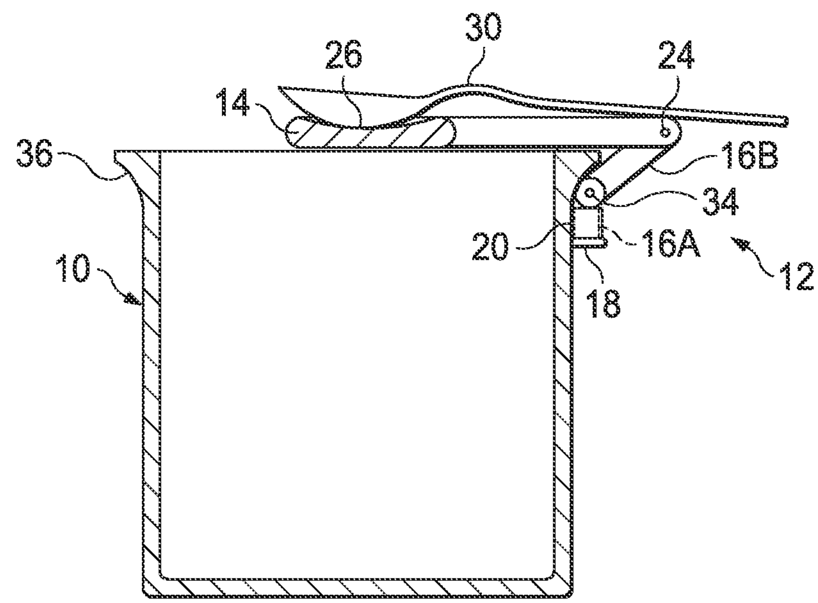
FIG. 6 is a cross-sectional view of yet another embodiment of the utensil holder.

Turning to FIG. 6, FIG. 6 is a simplified cross-sectional view of another embodiment of utensil holder 12. Pot 10 may include a flange 36 on its rim. Arm 16 of utensil holder 12 may be comprised of two separate sections 16A and 16B, hinged together with a hinge 38. Hinge 38 may be of any suitable construction to enable arm sections 16A and 16B to rotate with respect to each other, such that handle 14 may be turned over and dropped into a substantially horizontal position inside pot 10. In some embodiments, hinge 38 may enable locking arm 16 in a position (e.g., wherein sections 16A and 16B are straight relative to each other), and unlocked in another position (e.g., wherein sections 16A and 16B are angled relative to each other). In some embodiments hinge 38 may be integrated with locking mechanism 26. Sections 16A and 16B can allow utensil holder 12 to be rotated over and around flange 32, to enable handle 14 to be dropped into a substantially horizontal position over the rim of pot 10.

Figure 7:
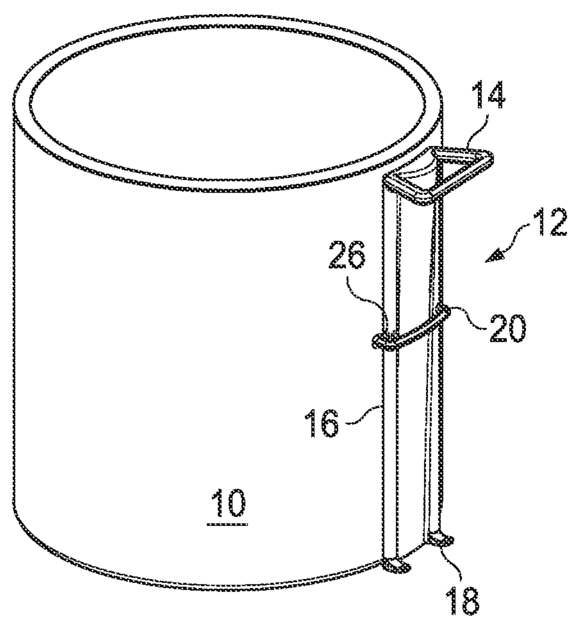
FIG. 7 is a simplified perspective view illustrating an example configuration of yet another embodiment of the utensil holder.

Turning to FIG. 7, FIG. 7 is a simplified perspective view of another embodiment of utensil holder 12. Handle 14 may be shaped to enable the utensil holder to be pulled or moved relative to pot 10. Arm 16 may comprise stopper 18 on a first end and handle 14 on another end. Stopper 18 may be attached to arm 16 using any suitable method; alternatively, stopper 18 may be formed as an integral part of arm 16. In some embodiments, stopper 18 may be attached to arm 16 using a lockable hinge.

Locking mechanism 26 may lock utensil holder 12 to pot 10. In the embodiment illustrated in FIG. 5, locking mechanism 26 may include a spring-loaded button that locks utensil holder 12 when pressed against sleeve 20. Utensil holder 12 may be positioned in multiple configurations, including a locked configuration and an unlocked configuration. In the locked configuration, utensil holder 12 may be used as a grip for pot 10. In the unlocked configuration, utensil holder 12 may be used as a spoon rest. In the configuration illustrated in FIG. 5, utensil holder 12 is shown in a locked configuration.

Figure 8:
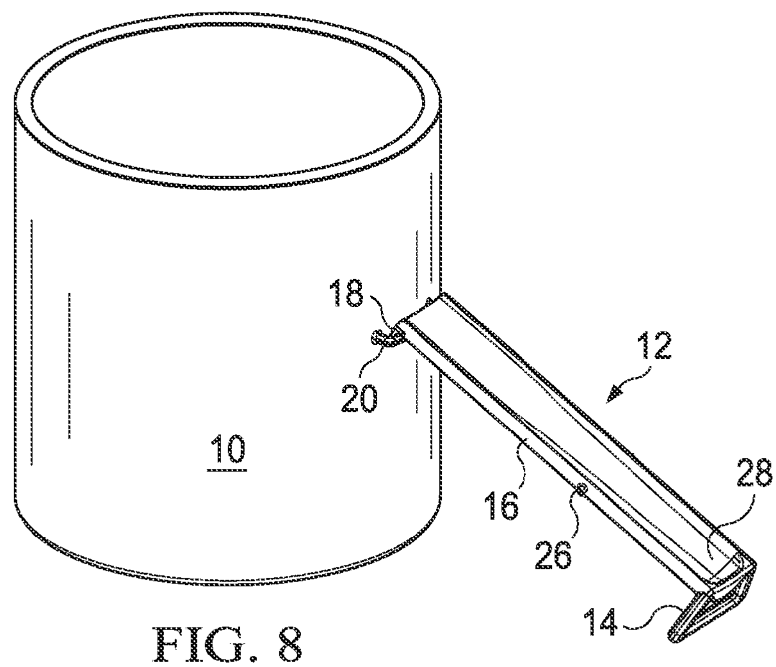
FIG. 8 is a simplified perspective view illustrating another example configuration of the yet another embodiment of the utensil holder.

Turning to FIG. 8, FIG. 8 is a simplified perspective view of another configuration of the another embodiment of utensil holder 12. In the configuration illustrated in FIG. 6, the utensil holder is shown in the unlocked configuration. Utensil holder 12 may be unlocked from sleeve 20, and pulled upward and/or outward. Handle 14 may be lowered until stopper 18 hits sleeve 20. Arm 16 may include recess 28 to receive spoon 30. In some embodiments, utensil holder 12 may be removed entirely out of sleeve 20, for example, to be used as an independent spoon rest, or for ease of washing, etc.

Figure 9:
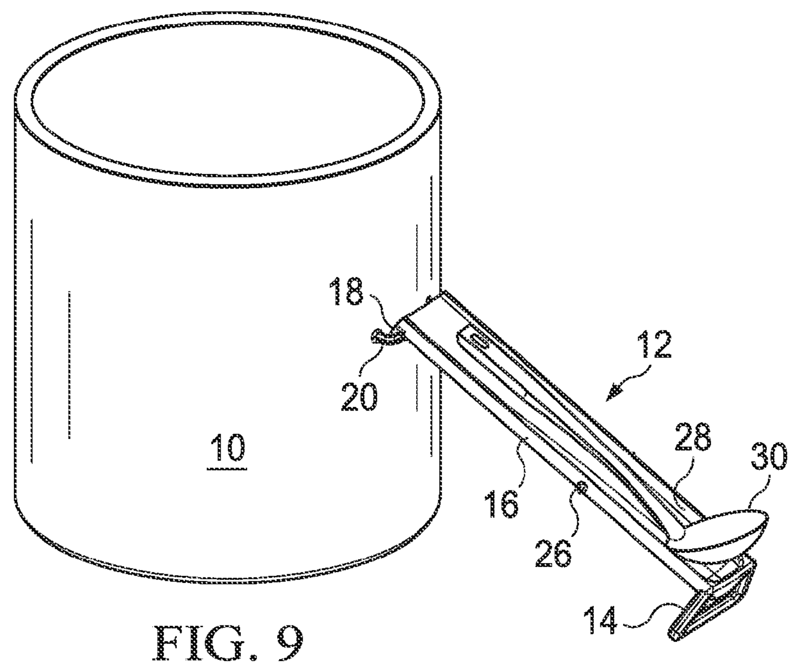
FIG. 9 is a simplified perspective view illustrating yet another configuration of the utensil holder.

Turning to FIG. 9, FIG. 9 shows yet another configuration of another embodiment of utensil holder 12. In the configuration wherein utensil holder 12 may be unlocked and used as a spoon rest, spoon 30 may be place into recess 28 such that the curved portion of the spoon rests in recess 28.

Figure 10A:
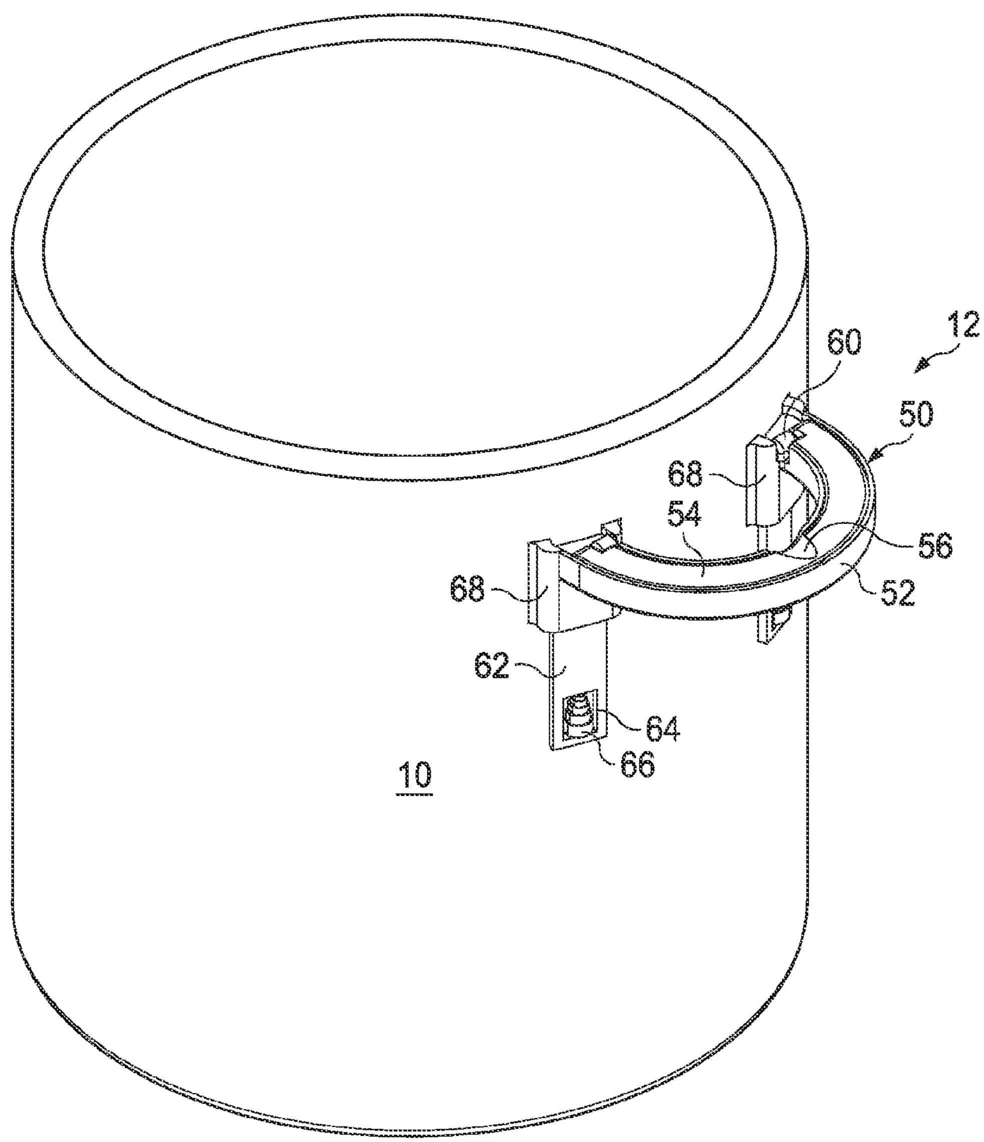
FIG. 10A is a simplified diagram illustrating yet another embodiment of the utensil holder in a first configuration.

Turning to FIG. 10A, FIG. 10A shows a configuration of yet another embodiment of utensil holder 12. Utensil holder 12 can include a handle 50 attached moveably to pot 10. Handle 50 may include a lower portion 52, and an upper portion 54 that may be separated from lower portion 52. Upper portion 54 may include a recess 56 for engaging with a spoon in one configuration. Handle 50 may include a hinge 60 connecting upper portion 54 with arms 62. Hinge 60 may enable upper portion 54 to rotate relative to pot 10. Arms 62 may include a cutout 64 and stopper 66. In one embodiment, stopper 66 may be made of discs of varying diameter. In another embodiment, stopper 66 may be a protrusion (e.g., cylindrical or prismatic) with a spring action perpendicular to a surface of arms 62 having the cutout 64. Arms 62 may be configured to slide through sleeves 68. Stopper 66 may be configured to prevent arms 62 from being separate altogether from pot 10 through sleeves 68. For example, stopper 66 may prevent arms 62 from being pulled upwards beyond a point. Sleeves 68 may be immovably attached to pot 10, for example, by brazing, welding, screwing, or other attachment mechanisms.

Figure 10B:
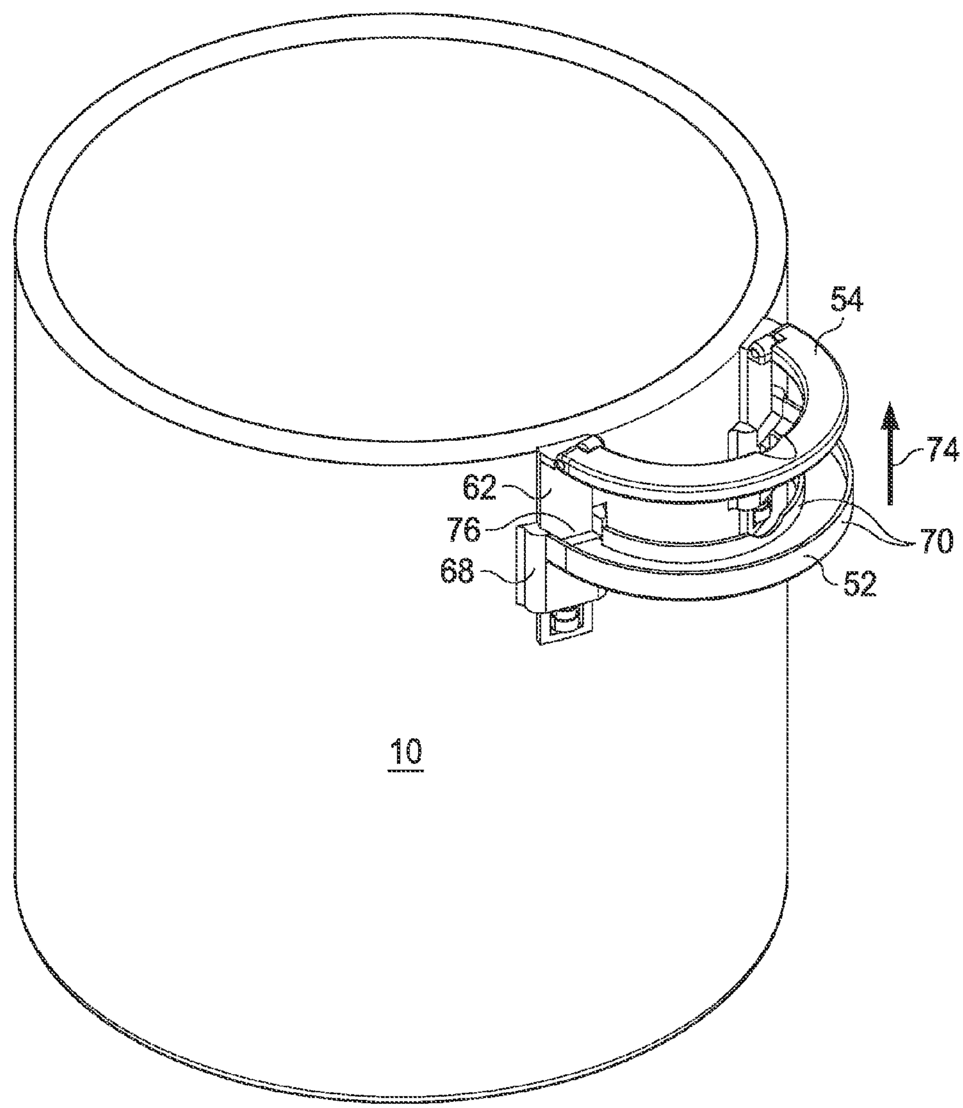
FIG. 10B is a simplified diagram illustrating another view of the yet another embodiment of the utensil holder.

Turning to FIG. 10B, FIG. 10B shows a snap-shot of utensil holder 12 moving from a first configuration, as shown in FIG. 10A to a second configuration. In some embodiments, lower portion 52 of handle 50 may include vertical portions 70 that enable upper portion 54 to fit snugly into lower portion 52 resulting in a small form-factor for handle 50. Upper portion 54 may be pulled up in a direction shown by arrow 74 towards the top portion of pot 10. Arms 62 may slide through holes 76 between arms 62 and sleeves 68. In some embodiments, holes 76 may be enabled by a large tolerance between arms 62 and sleeves 68. In other embodiments, holes 76 may be created in sleeve 68 by any machining operation. Holes 76 may be configured to enable arms 62 to slide without appreciable resistance through sleeves 68.

Figure 10C:
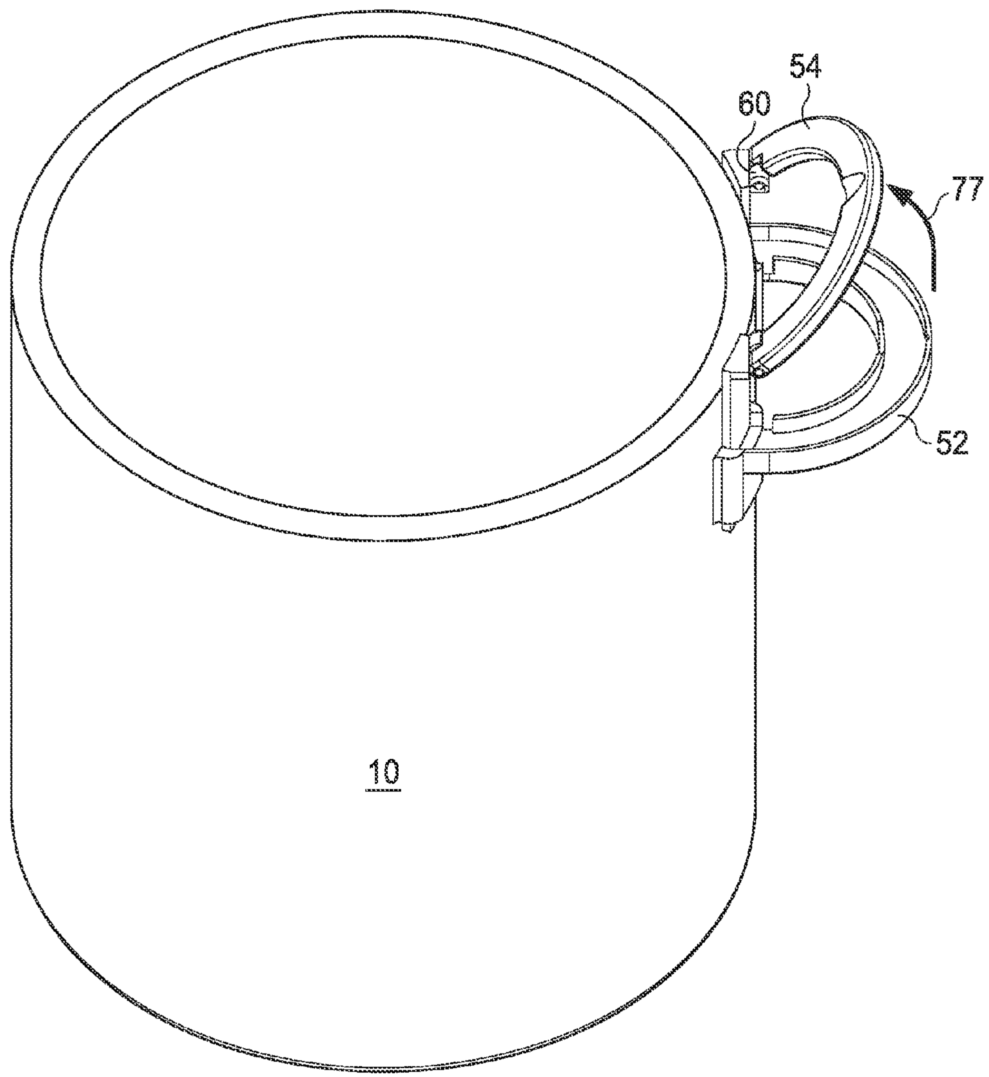
FIG. 10C is a simplified diagram illustrating yet another view of the yet another embodiment of the utensil holder.

Turning to FIG. 10C, FIG. 10C shows another snap-shot of utensil holder 12 moving from the first configuration, as shown in FIG. 10A to the second configuration. Upper portion 54 may be rotated around hinge 60 in a direction shown by arrow 77, from the outside of pot 10 towards the inside of pot 10.

Figure 10D:
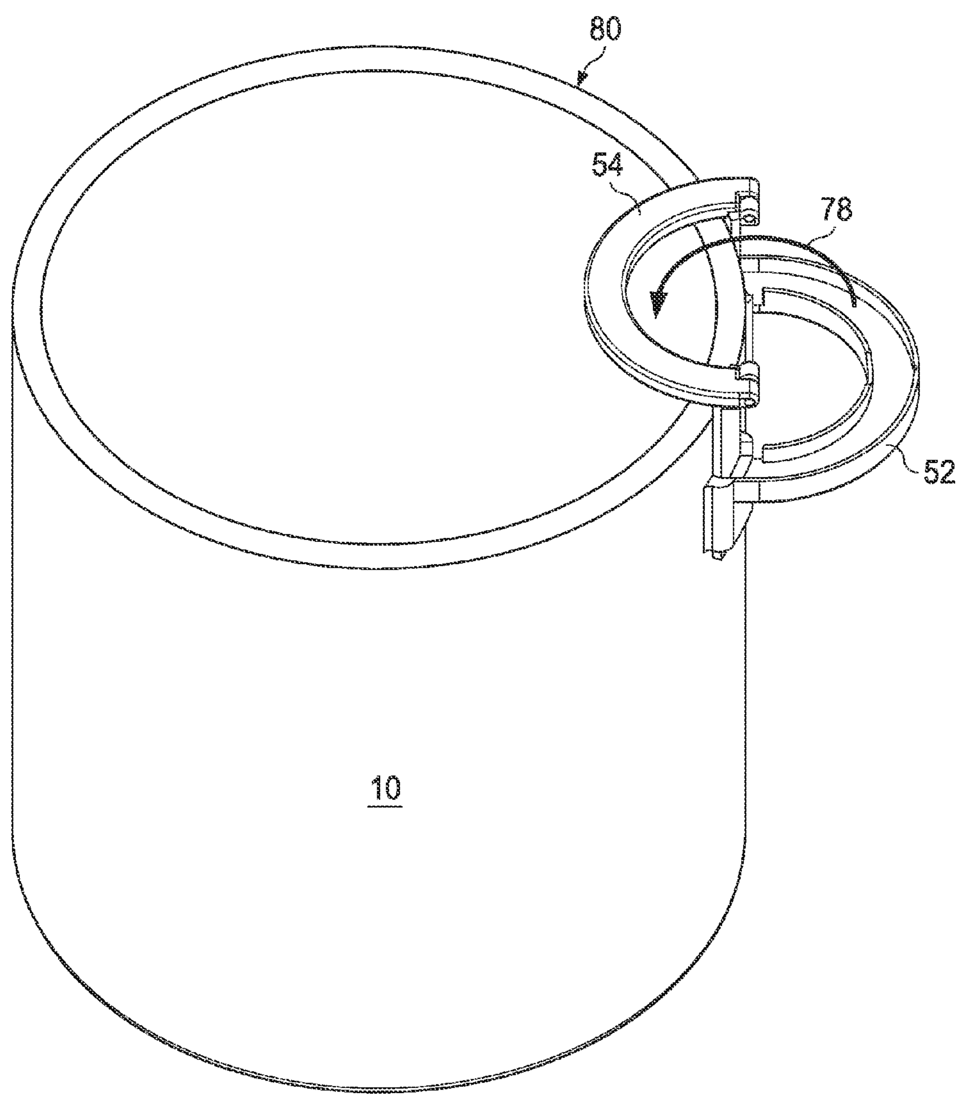
FIG. 10D is a simplified diagram illustrating a second configuration of the yet another embodiment of the utensil holder.

Turning to FIG. 10D, FIG. 10D shows utensil holder 12 in the second configuration. In the second configuration, upper portion 54 may be rotated approximately 180° around hinge 60 in a direction shown by arrow 78, to rest over rim 80 of pot 10. In the second configuration, upper portion 54 may be used as a spoon rest, with the spoon's head resting on upper portion 54, for example, to enable any dripping to fall into pot 10. In some embodiments, a side of upper portion 54 that is turned upwards may include a recess (not shown) to facilitate resting the spoon comfortably. Note that because lower portion 52 is immovable relative to pot 10, lower portion 52 can continue to be used as a grip to lift pot 10 in the second configuration.

Figure 11:
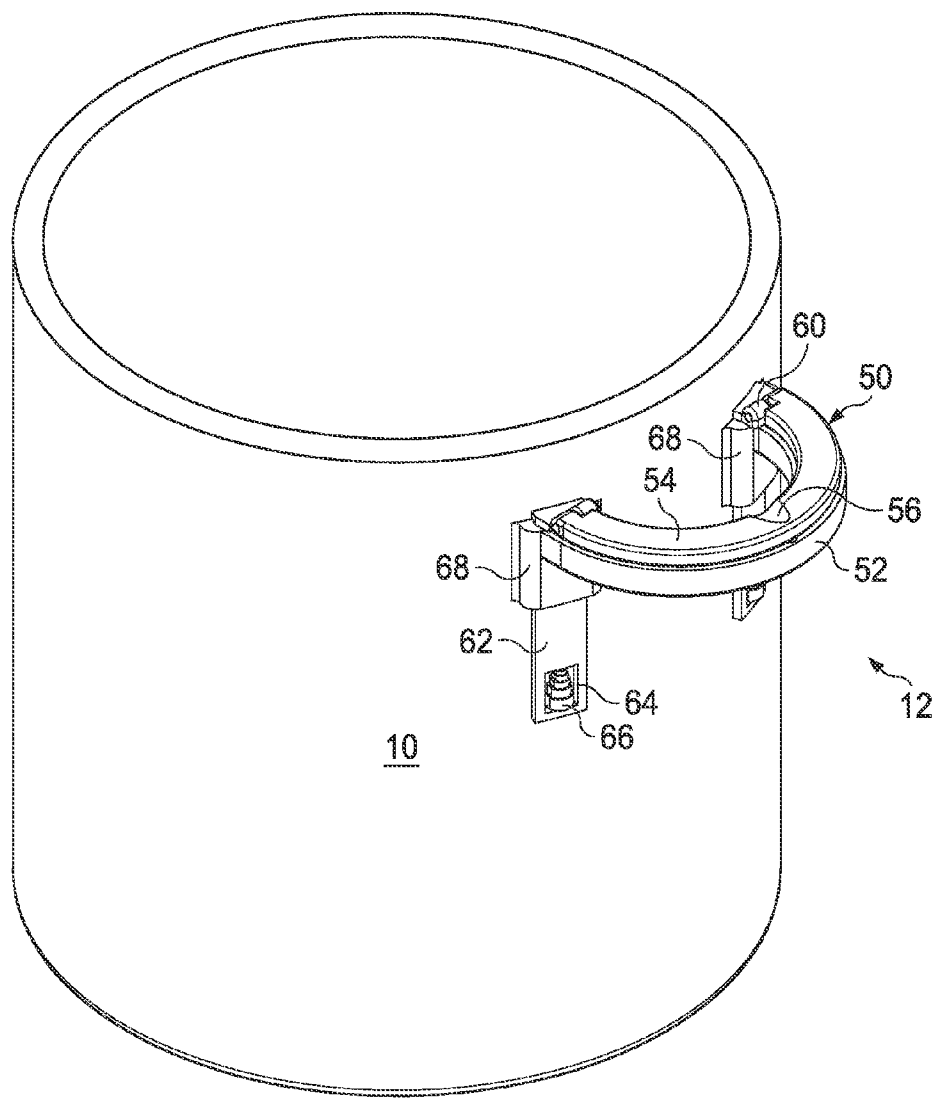
FIG. 11 is a simplified diagram illustrating yet another embodiment of the utensil holder.

Turning to FIG. 11, FIG. 11 is a simplified diagram showing yet another embodiment of utensil holder 12. In the embodiment shown in FIG. 11A, upper portion 54 of handle 50 may rest on top of lower portion 52. Lower portion 52 may have a substantially flat top surface in some embodiments, and upper portion 54 may have a correspondingly flat bottom surface, so that upper portion 54 rests freely on top of lower portion 52. In other embodiments, upper portion 54 may snap into lower portion 52. In such embodiments, upper portion 54 may have a flexible tongue overlapping upper portion 54 in a locked configuration. The flexible tongue may be pushed outwards (or sidewards) to unlock upper portion 54 and enable it to move upwards.

Figure 12A:
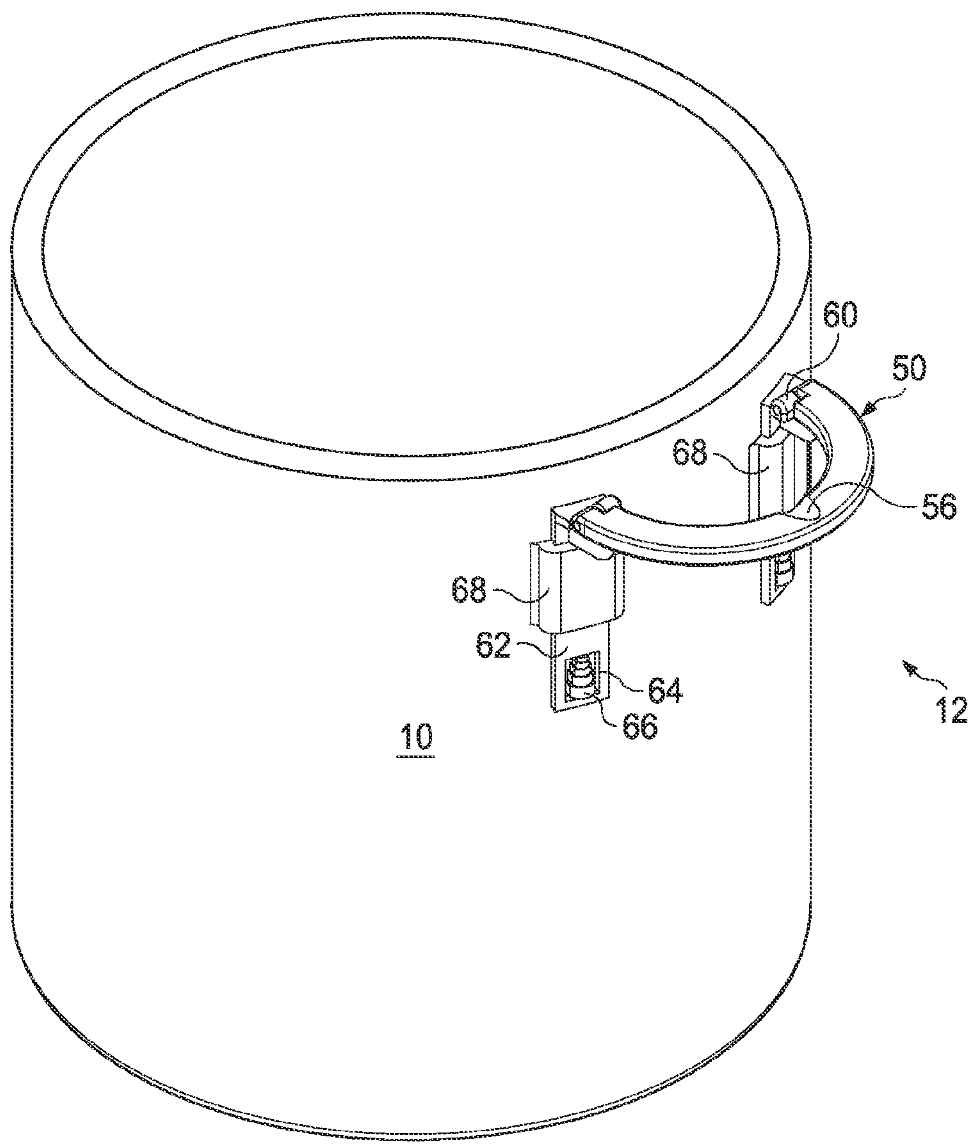
FIG. 12A is a simplified diagram illustrating yet another embodiment of the utensil holder in a first configuration.

Turning to FIG. 12A, FIG. 12A is a simplified diagram showing yet other embodiment of utensil holder 12. Utensil holder 12 includes handle 50 that can be pushed up and over the rim of pot 10 to enable supporting a spoon within pot 10. In a first configuration, handle 50 may be substantially horizontal, enabling it to be used as a grip to lift pot 10. Handle 50 may be connected to arms 62 with hinges 60. Hinges 60 may enable handle 50 to be rotated substantially 180° from a first position outside pot 10 to a second position over the rim and inside pot 10. Arms 62 may be configured to move up and down through sleeves 68. Stoppers 66 may prevent arms 62 from being lifted off pot 10 altogether.

Figure 12B:
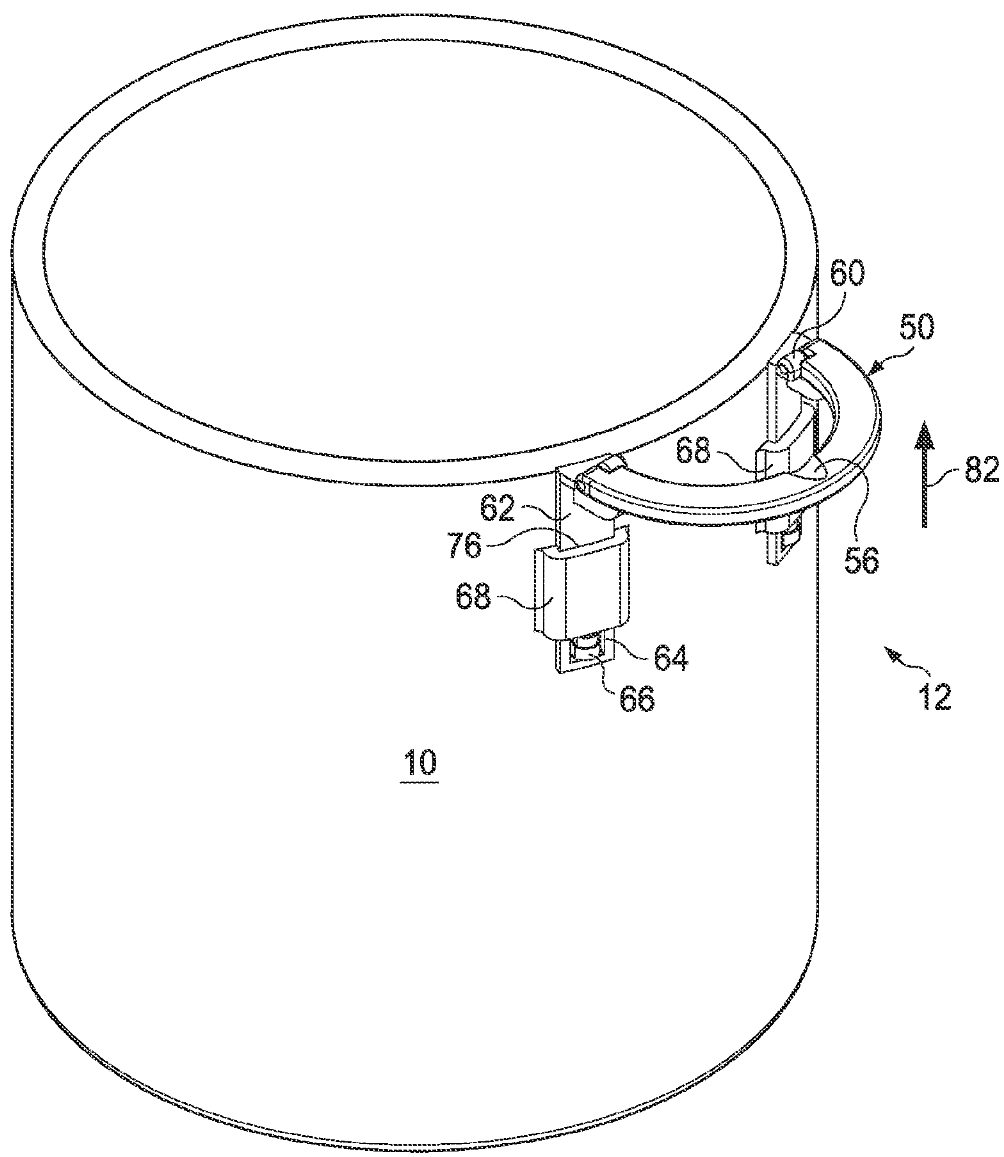
FIG. 12B is a simplified diagram illustrating another view of the yet another embodiment of the utensil holder.

Turning to FIG. 12B, FIG. 12B shows a snap-shot of utensil holder 12 moving from the first configuration, as shown in FIG. 12A to a second configuration. Handle 50 may be moved up in a direction shown by an arrow 82. Arms 62 may translate up and down through holes 76 between arms 62 and sleeves 68. Stoppers 66 may appropriately prevent arms 62 from being lifted off pot 10 altogether.

Figure 12C:
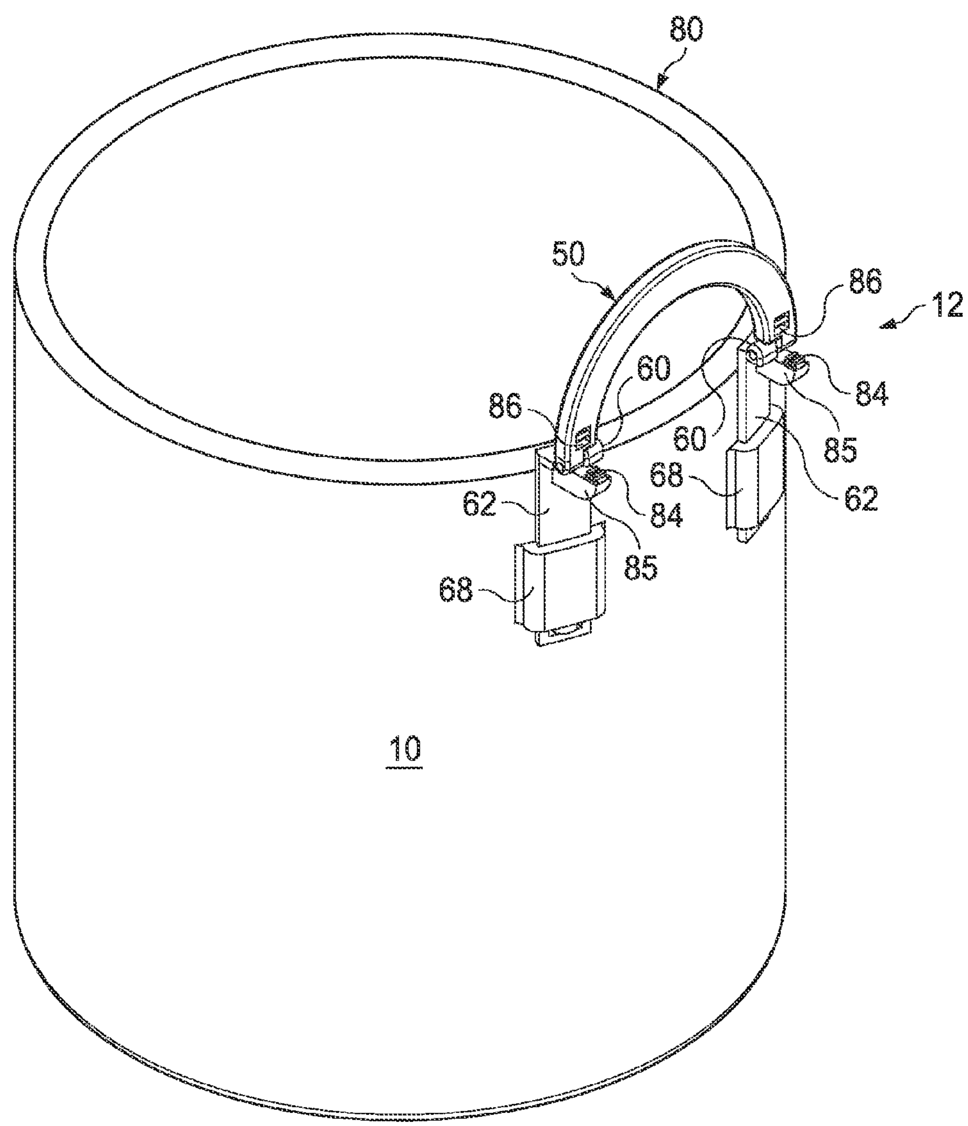
FIG. 12C is a simplified diagram illustrating yet another view of the yet another embodiment of the utensil holder.

Turning to FIG. 12C, FIG. 12C shows a snap-shot of utensil holder 12 moving from the first configuration, as shown in FIG. 12A to the second configuration. In the view shown, handle 50 has been unlocked from a substantially horizontal position and has been rotated around hinges 60 by substantially 90°. In some embodiments, utensil holder 12 may include a locking mechanism, comprising one or more ridges 84 and corresponding indents 86 in handle 50. When handle 50 is in the first configuration, (e.g., outside pot 10, and usable to lift pot 10) ridges 84 may mate with corresponding indents 86 to lock handle 50 substantially horizontally in the first configuration. Indents 86 may be unlocked from ridges 84 (e.g., by exerting upward pressure on handle 50) to enable handle 50 to be rotated around hinges 60. In some embodiments, ridges 84 may be formed (e.g., machined, attached, stuck, etc.) on appropriate bars 85. In one embodiment, bars 85 may be substantially horizontal, and ridges 84 may be substantially vertical.

Ridges 84 may be of any suitable shape and configuration to enable handle 50 to be locked in a substantially horizontal position. For example, each of ridges 84 may be 'L-shaped' and attached to arms 62. One arm of the L-shape may be horizontal, and the other arm may be vertical. The vertical arm may mate with a corresponding one of indents 86 in handle 50. In another example, ridges 84 may be in handle 50, and corresponding indents 86 may be in bars 85. Any suitable locking mechanism may be used to enable handle 50 to be locked in a substantially horizontal position relative to, and outside, pot 10, within the broad scope of the embodiments.

Figure 12D:
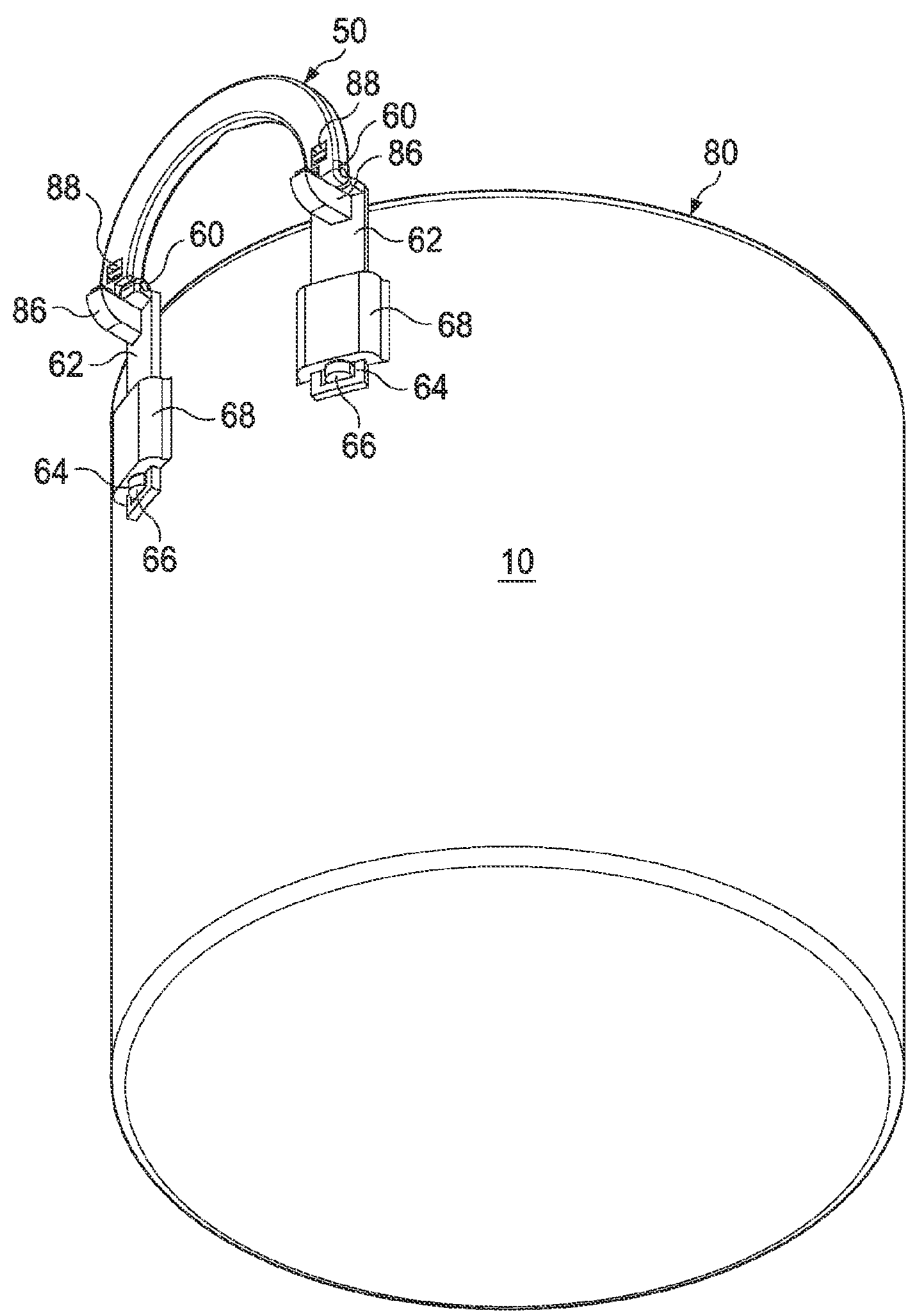
FIG. 12D is a simplified diagram illustrating yet another view of the yet another embodiment of the utensil holder.

Turning to FIG. 12D, FIG. 12D shown another view of the snapshot of FIG. 12C. Stoppers 66 may be visible in detail in FIG. 12D. In one embodiment, stoppers 66 may comprise discs of varying diameters (e.g., monotonically arranged from a small to a large diameter, with the lowest disc having the largest diameter) that may be pushed inwards, towards pot 10, as arms 62 moves up through sleeves 68. In one example embodiment, the uppermost disc with the smallest diameter may rest against sleeves 68, preventing upward movement of arms 62, and locking arms 62 in place. In such configuration, handle 50 may be pulled up, without allowing arms 62 to move upwards. Handle 50 may thus be used as a grip to pull pot 10 upwards.

To unlock arms 62, the uppermost disc (and other discs beneath) may be pushed inwards towards a vertical surface of pot 10 and arms 62 may be pulled up substantially simultaneously. Stoppers 66 may also include a disc (e.g., lowermost disc) that cannot be pushed inwards, and is of a diameter sufficient to hit against sleeve 68 to prevent further upward movement of arms 62 through sleeves 68. Stoppers 66 may be configured such that when arms 62 cannot be translated upwards any further, handle 50 may be rotated around hinges 60 over rim 80 towards the inside of pot 10.

Figure 12E:
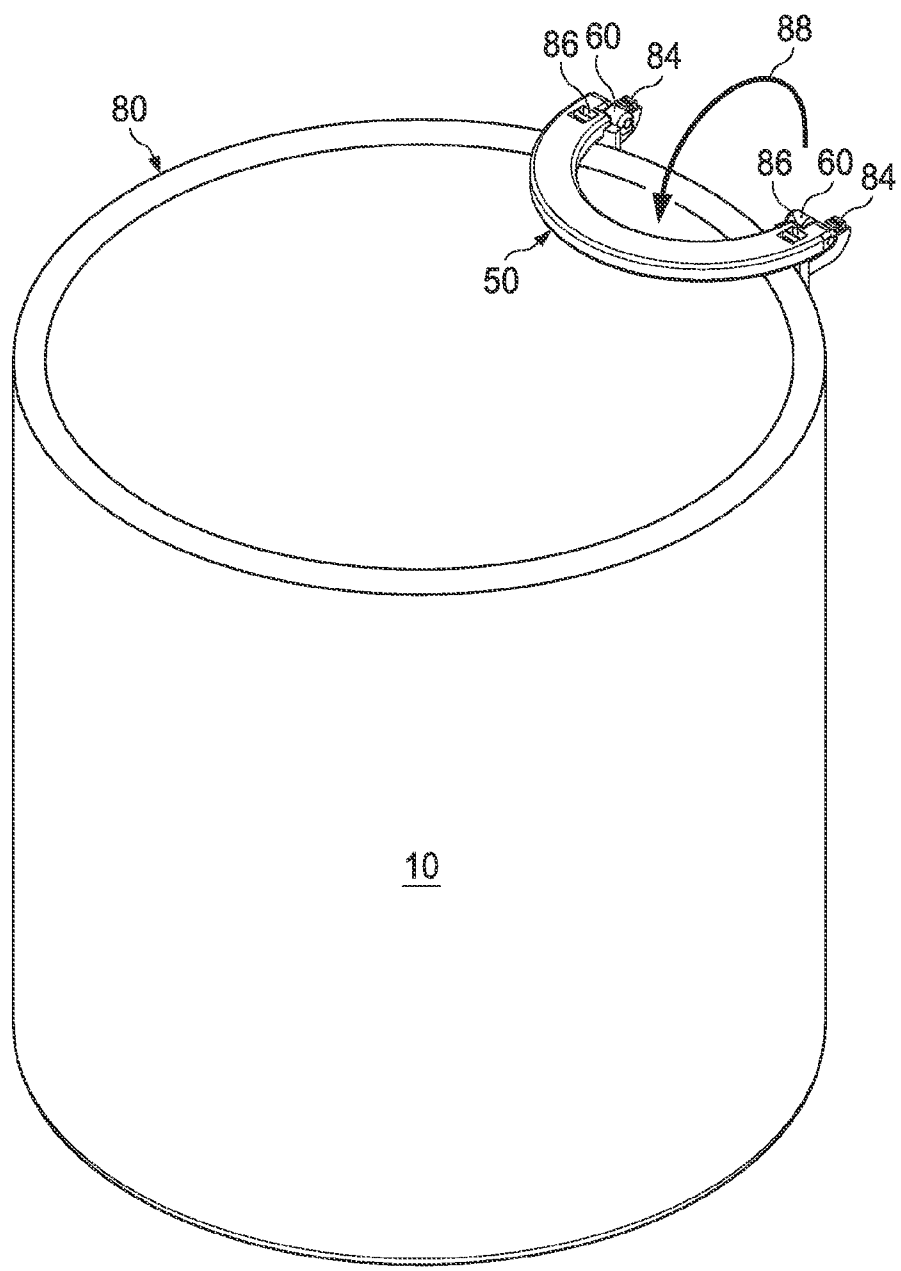
FIG. 12E is a simplified diagram illustrating a second configuration of the yet another embodiment of the utensil holder.

Turning to FIG. 12E, FIG. 12E shows utensil holder 12 in a second configuration, over rim 80 of pot 10 and turned inwards into pot 10. Handle 50 may be rotated around hinges 60 in a direction shown by an arrow 86, substantially 180° from the first configuration. In the second configuration, a spoon (or other object) may be placed over handle 50, for example, so that any dripping may fall into pot 10, or for other suitable purposes. To bring utensil holder 12 back to the first configuration, handle 50 may be flipped backwards (in a reverse direction of arrow 86), and arms 62 may be pushed down until handle 50 is back in the first configuration.

Figure 13A:
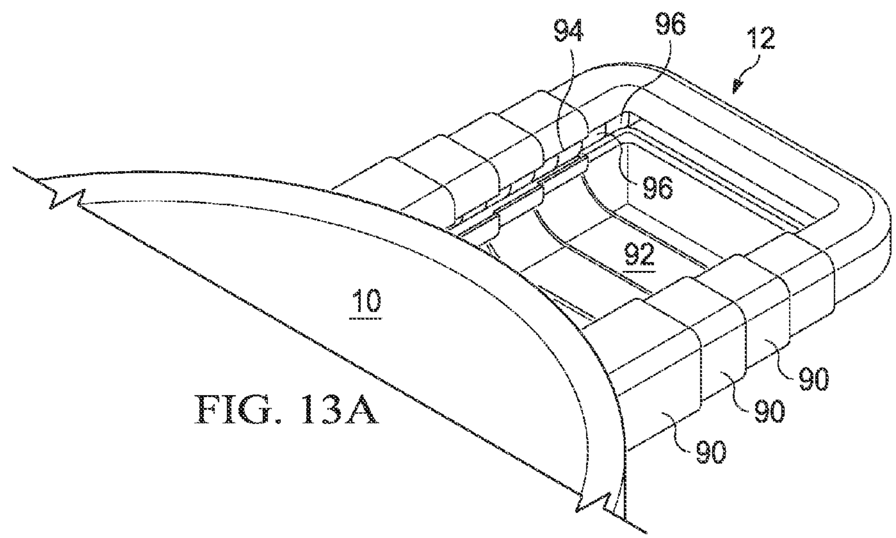
FIG. 13A is a simplified diagram illustrating another embodiment of the utensil holder.
Figure 13B:
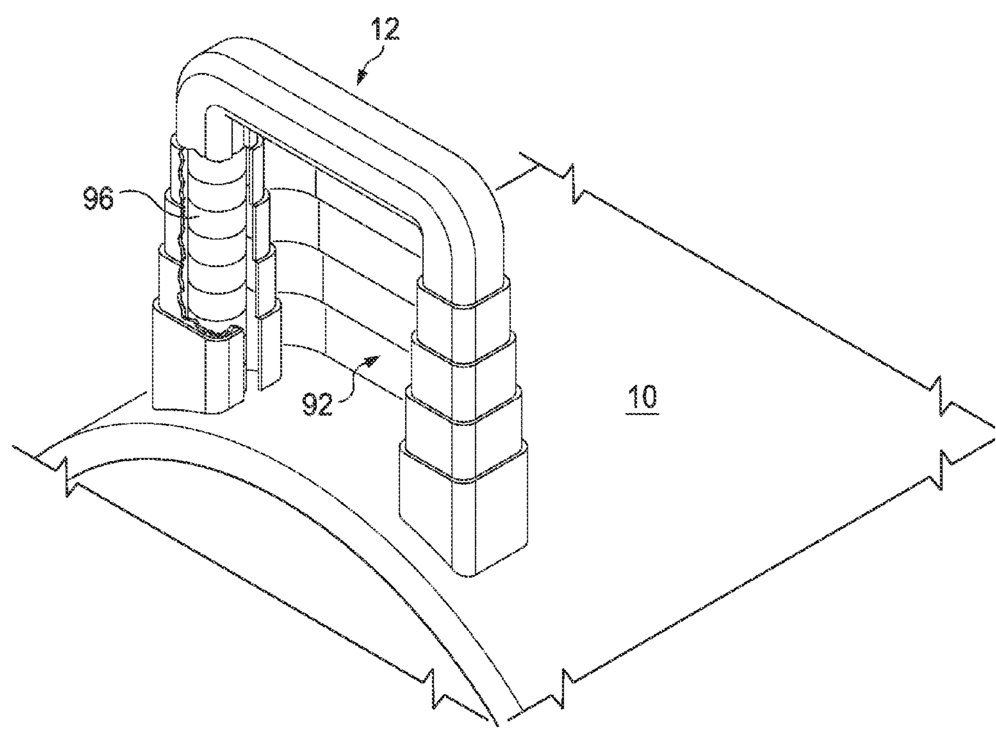
FIG. 13B is a simplified diagram illustrating example details of an embodiment of the utensil holder.

Turning to FIGS. 13A and 13B, FIGS. 13A and 13B are simplified diagrams illustrating perspective views of another example embodiment of utensil holder 12. Utensil holder 12 can comprise a telescopic handle, including a plurality of telescopic parts 90 configured to be pulled outward from pot 10 to reveal a surface 92. Plurality of telescopic parts 90 may be reciprocally slidable out of or into each other, to lengthen or shorten the handle. Surface 92 may be used to support other objects, such as spoons and ladles. Surface 92 may form a deep recess (e.g., niche, depression) in some embodiments and a shallow recess in other embodiments. A track 94 may facilitate traction rails 96 to lock plurality of telescopic parts 90 at a desired position. Traction rails 96 may comprise plastic or rubber or other high friction materials in some embodiments, for example, to increase traction. In FIG. 13B, telescopic parts 90 have been shown cut out, to reveal traction rails 96 in detail.

In some embodiments, utensil holder 12 may be configured to be hinged (e.g., as shown in FIG. 1), and may be pulled outward and upward and rotated over the top of pot 10 to be disposed inside pot 10. The handle may be pulled outward by pulling the plurality of telescopic parts 90, and a spoon or other object may be conveniently located on revealed surface 92.

In terms of the dimensions of the articles discussed herein (e.g., holder 12, arms 16, handle 14, etc.), any suitable specifications (e.g., length, width, depth (or height), opening space, etc.) may be used and can be based on particular end user needs, or specific elements to be addressed by the apparatus (or the system in which it resides). It is imperative to note that all of the specifications and relationships outlined herein (e.g., height, width, length, diameter, # of arms, etc.) have only been offered for purposes of example and teaching only. Each of these data may be varied considerably without departing from the spirit of the present disclosure, or the scope of the appended claims. The specifications apply only to one non-limiting example and, accordingly, should be construed as such. Along similar lines, the materials used in constructing the articles can be varied considerably, while remaining within the scope of the present disclosure. Various ferrous/alloy materials may be used, magnetic materials may be used, and polymers (e.g., heat resistant material) may be used in certain configurations of the present disclosure. Still other configurations may include certain integrations of these materials, which may be based on particular working needs.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

In certain implementations and numerous examples provided herein, utensil holder 12 is described in reference to pot 10, and spoon 30. Utensil holder 12, however, is not limited to pots and spoons, but can be applied to a myriad of other types of containers (e.g., cooking pots, paint container, dry food containers, utility buckets, tool boxes, fishing tackle boxes, etc.) and any corresponding utensils (e.g., ladles, work tools (e.g., screwdrivers, hammers, pliers, scissors, etc.), brushes, spoons, measuring instruments, spatulas, stirrers, whisks, certain containers (e.g., those providing foodstuff such as spices, etc.), basters, forks, etc.). It will be appreciated that the broad teachings disclosed herein are intended to include any type of containers that can be used to store materials, and associated utensils that can be used, for example, to stir, mix, scoop, etc. contents from the respective containers.

Moreover, the elements described herein may be made of any suitable materials, including metal (e.g., stainless steel, copper, silver, brass, cast iron, enamel covered cast iron, aluminum, etc.), plastic, wood (e.g., bamboo, beech wood, etc.), terra cotta, stoneware, etc. or any suitable combination thereof. Each element may also be made of a combination of different materials (e.g., pot may be made of stainless steel with copper bottom; the utensil holder may include handle 14 made of plastic, and arm 16 made of metal; etc.). Any suitable material or combination of materials may be used for the elements described herein without departing from the broad scope of the present disclosure.

In addition, the shapes shown and illustrated in the various FIGURES are for example purposes only. Various other shapes may be used herein without changing the scope of the present disclosure. For example, pot 18 may be shaped as a casserole dish, pressure cooker pot, frying pan, bucket, paint container, etc. Spoon 30 may be curved (e.g., soup ladle), straight (e.g., spatula; brush), or provided in other suitable shapes.

Hinges (e.g., hinges 24, 38) and locking mechanisms (e.g., locking mechanism 26) may include any suitable design and/or configuration that enable them to perform their respective functionalities. For example, any suitable hinge shape/design/type that enables relative rotation of two elements (e.g., arm sections 16A, 16B; handle 14 and arm 16; etc.) may be used within the broad scope of the present disclosure. Such hinges may further be designed to permit locking/unlocking mechanisms, for example, based on position (e.g., relative angles of the rotating elements), or other parameters (e.g., pulling/pushing) or a combination. Likewise, locking mechanism 26 may include a wide variety of locking mechanisms, including button-in-hole, spring-loaded button, tongue and groove, etc.

While the disclosure references several particular embodiments, those skilled in the art will be able to make various modifications to the described embodiments without departing from the true spirit and scope of the disclosure. It is intended that all elements or steps, which are insubstantially different from those, recited in the claims but perform substantially the same functions, respectively, in substantially the same way to achieve the same result as what is claimed are within the scope of the disclosure.

What is claimed is:

1. An apparatus comprising:
- a pot with a sleeve attached to an outside portion of the pot; and
- a utensil holder coupled to the pot, wherein the utensil holder comprises:
  - an arm disposed through the sleeve; and
  - a handle pivotally attached to the arm, such that the handle can be rotated relative to the arm to position the handle, wherein the handle comprises a lower portion substantially immovable relative to the pot, and an upper portion that can be translated and rotated relative to the pot.

2. The apparatus of claim 1, wherein the sleeve is attached to the outside portion of the pot by a process selected from a group comprising: welding, brazing, riveting, gluing, and fastening with a screw.

3. The apparatus of claim 1, wherein the utensil holder can be positioned in at least a first configuration and a second configuration, wherein:
- in the first configuration, the upper portion and the lower portion of the handle are positioned outside the pot to enable the upper portion and the lower portion of the handle to be simultaneously used as a grip for the pot, and
- in the second configuration, the upper portion of the handle is positioned over an opening in the pot to enable the handle to support an object over the opening in the pot.

4. The apparatus of claim 3, wherein in the first configuration, the upper portion of the handle can be locked to the arm such that there is substantially no relative rotation between the handle and the arm, and wherein the handle can be locked to the arm based on coupling an indent located in a bottom surface of the upper portion of the handle comprises to a ridge.

5. The apparatus of claim 1, wherein the handle is attached to the arm with a hinge.

6. The apparatus of claim 1, wherein the arm is slidable through the sleeve.

7. The apparatus of claim 6, wherein the arm can be locked into the sleeve with a locking mechanism.

8. The apparatus of claim 7, wherein the locking mechanism comprises:
- a spring-loaded button on the arm configured to be inserted into a corresponding hole in the sleeve, such that:
  - when the spring loaded button is inserted into the corresponding hole, the arm is locked into the sleeve; and when the spring-loaded button is disengaged from the corresponding hole, the arm is unlocked from the sleeve.

9. The apparatus of claim 7, wherein the arm comprises stoppers that prevent uncoupling the utensil holder from the sleeve regardless of whether the arm is locked into the sleeve with the locking mechanism.

10. The apparatus of claim 1, further comprising another arm disposed through another sleeve attached to the outside portion of the pot, wherein the handle is pivotally attached to the another arm.

11. The apparatus of claim 1, wherein the handle comprises a recess configured to support an object.

12. The apparatus of claim 1, wherein the entire upper portion of the handle fits into a cavity within the lower portion of the handle while the arm is disposed through the sleeve.

13. The apparatus of claim 1, wherein the upper portion of the handle can rest on top of the lower portion.

14. An apparatus comprising:

a pot with a sleeve attached to an outside portion of the pot; and a utensil holder coupled to the pot, wherein the utensil holder comprises:

a plurality of arms, each arm comprising a plurality of telescopic parts configured to be pulled perpendicularly outward from the outside portion of the pot to reveal a surface, wherein the surface spans an entire distance between the plurality of arms to form a recess;

a groove with traction rails located within the each of the plurality of arms, wherein the traction rails facilitate locking the plurality of telescopic parts, and wherein the plurality of telescopic parts lock based on friction between the traction rails and a track proximate the groove.

15. The apparatus of claim 14, wherein the surface is configured to support an object.

16. The apparatus of claim 9, wherein the arm comprises a cutout in which the stoppers are located, the stoppers include a plurality of discs, and at least one of the plurality of discs can contact a portion of the sleeve to prevent uncoupling the utensil holder from the sleeve.

* * * * *